United States Patent
Jenski, Jr. et al.

(10) Patent No.: US 11,280,438 B2
(45) Date of Patent: Mar. 22, 2022

(54) QUICK DISCONNECT COUPLING WITH INTERNAL VALVES

(71) Applicant: Eaton Intelligent Power Limited, Dublin (IE)

(72) Inventors: Gary M. Jenski, Jr., Jackson, MI (US); William T. Flynn, Horton, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/949,475

(22) Filed: Oct. 30, 2020

(65) Prior Publication Data

US 2021/0131598 A1    May 6, 2021

Related U.S. Application Data

(60) Provisional application No. 62/928,806, filed on Oct. 31, 2019.

(51) Int. Cl.
*F16L 37/36* (2006.01)
*F16L 37/34* (2006.01)

(52) U.S. Cl.
CPC .............. *F16L 37/36* (2013.01); *F16L 37/34* (2013.01)

(58) Field of Classification Search
CPC .................................. F16L 37/36; F16L 37/34
USPC ......................................... 137/614.03, 614.04
See application file for complete search history.

(56) References Cited

U.S. PATENT DOCUMENTS

| | | | | |
|---|---|---|---|---|
| 3,211,178 A | * | 10/1965 | Kiszko | F16L 27/0824 137/614.04 |
| 5,014,743 A | * | 5/1991 | Makishima | F16L 37/23 137/614.03 |
| 7,044,155 B2 | * | 5/2006 | Zanolin et al. | F16L 37/56 137/340 |
| 8,602,056 B2 | * | 12/2013 | Schutz | F16L 37/565 137/614.03 |
| 10,161,552 B2 | | 12/2018 | Tiberghien et al. | |
| 2007/0102050 A1 | | 5/2007 | Maldavs | |
| 2015/0233511 A1 | | 8/2015 | Lemay et al. | |
| 2015/0267850 A1 | | 9/2015 | Nowack et al. | |

* cited by examiner

*Primary Examiner* — Kevin L Lee
(74) *Attorney, Agent, or Firm* — Merchant & Gould P.C.

(57) ABSTRACT

A quick disconnect coupling can include a first part and a second part. The first part can define a primary fluid passageway and a secondary fluid passageway and can include a first valve movable between open and closed positions to control flow through the first part secondary fluid passageway. The second part can define a second part defining a primary fluid passageway and a secondary fluid passageway and can include a second valve movable between open and closed positions to control flow through the second part secondary fluid passageway. In one aspect, the second part is removably connectable to the first part such that, when connected the first and second part primary passageways are placed in fluid communication with each other and the first and second valves are operable between the open and closed positions to selectively place the secondary fluid passageways of the first and second parts in fluid communication with each other.

20 Claims, 7 Drawing Sheets

US 11,280,438 B2

QUICK DISCONNECT COUPLING WITH INTERNAL VALVES

RELATED APPLICATIONS

This application claims priority to U.S. Provisional Patent Application Ser. No. 62/928,806, filed on Oct. 31, 2019, the entirety of which is incorporated by reference herein.

BACKGROUND

Line replaceable units (LRU's) are commonly used in fluid conveyance systems (e.g. hydraulic and coolant systems) where a system or subsystem must be readily replaceable. In a typical configuration, the hydraulic system connected to the LRU must be drained before the LRU can be disconnected and can only be refilled after a new LRU has been installed. Once the system has been re-filled the system must also be bled of air. Such processes are labor and time intensive. Improvements are desired.

SUMMARY

A quick disconnect coupling can include a first part and a second part. The first part can define a primary fluid passageway and a secondary fluid passageway, and can include a first valve movable between open and closed positions to control flow through the first part secondary fluid passageway. The second part can define a primary fluid passageway and a secondary fluid passageway and can include a second valve movable between open and closed positions to control flow through the second part secondary fluid passageway. In one aspect, the second part is removably connectable to the first part such that, when connected the first and second part primary passageways are placed in fluid communication with each other, and the first and second valves are operable to place the secondary fluid passageways of the first and second parts in fluid communication with each other.

A quick disconnect coupling can include a first part defining a primary fluid passageway and a secondary fluid passageway, and can include a first valve movable between open and closed positions to control flow through the first part secondary fluid passageway and a primary valve movable between open and closed positions to control flow through the first part primary passageway. The quick disconnect coupling can also include a second part defining a primary fluid passageway and a secondary fluid passageway, and can include a second valve movable between open and closed positions to control flow through the second part secondary fluid passageway and a primary valve movable between open and closed positions to control flow through the second part primary passageway. In one aspect, the second part is removably connectable to the first part such that, when connected, the first and second part primary valves are open to place the primary passageways of the first and second parts in fluid communication with each other and the first and second valves are operable to place the secondary fluid passageways of the first and second parts in fluid communication with each other.

In some examples, one or both of the first and second valves allow fluid flow in a first direction and prevent fluid flow in a second direction.

In some examples, one or both of the first and second valves is a check valve.

In some examples, the first valve is a relief valve and the second valve is a check valve.

In some examples, the second valve is a bleed-check valve.

In some examples, the first and second valves are biased towards a closed position.

In some examples, the first and second valves are biased in the same direction.

In some examples, the first valve and the second valve abut each other when the first and second parts are connected to each other.

In some examples, fluid flow from the first part secondary fluid passageway to the second part secondary fluid passageway is prevented when either of the first and second valves is in the closed position.

In some examples, the first valve is moved from the closed position towards the open position by fluid pressure.

In some examples, the second valve is moved from the closed position towards the open position by the first valve or by fluid pressure.

In some examples, the secondary fluid passageways of the first and second parts are coaxial with the primary fluid passageways of the first and second parts.

In some examples, the secondary fluid passageways of the first and second parts are surrounded by the primary fluid passageways of the first and second parts.

A quick disconnect coupling can include a first part defining a primary fluid passageway and a secondary fluid passageway, the first part including a relief valve controlling flow through the secondary fluid passageway; and a second part defining a primary fluid passageway and a secondary fluid passageway, the second part including a check valve controlling flow through the secondary fluid passageway, the second part being removably connectable to the first part such that, when connected, the relief and check valves are operable to allow for fluid flow from the first part secondary fluid passageway into the second part secondary fluid passageway.

In some examples, the relief and check valves allow fluid flow in a first direction and prevent fluid flow in a second direction.

In some examples, the relief and check valves are biased towards a closed position.

In some examples, the relief and check valves abut each other when the first and second parts are connected to each other.

In some examples, fluid flow from the first part secondary fluid passageway to the second part secondary fluid passageway is prevented when either of the relief and check valves is in the closed position.

In some examples, the relief valve is moved from the closed position towards the open position by fluid pressure.

In some examples, the check valve is moved from the closed position towards the open position by the relief valve or by fluid pressure.

In some examples, the secondary fluid passageways of the first and second parts are coaxial with the primary fluid passageways of the first and second parts.

In some examples, the secondary fluid passageways of the first and second parts are surrounded by the primary fluid passageways of the first and second parts.

A quick disconnect coupling can include a first part defining a primary fluid passageway and a secondary fluid passageway, the first part including first and second valve structures movable between open and closed positions to control flow through the first part secondary fluid passageway; and a second part defining a primary fluid passageway and a secondary fluid passageway, the second part including a third and fourth valve structures movable between open and closed positions to control flow through the second part secondary fluid passageway; wherein the second part is removably connectable to the first part such that, when connected: the first and second part primary passageways are placed in fluid communication with each other; and the first and third valves are placed in an open position and the second and fourth valves are biased towards a closed position.

In some examples, one or more of the first through fourth valves allow fluid flow in a first direction and prevent fluid flow in a second direction.

In some examples, the first and third valves are check valves.

In some examples, the second and fourth valves are relief valves and the first and third valves are check valves.

In some examples, the first and third valves are biased towards a closed position.

In some examples, the third valve is concentrically arranged within the first valve and wherein the fourth valve is concentrically arranged within the second valve.

In some examples, the second valve and the third valve abut each other when the first and second parts are connected to each other.

In some examples, fluid flow from the first part secondary fluid passageway to the second part secondary fluid passageway is prevented when either of the first and third valves is in the closed position.

In some examples, the second and fourth valves are moved from the closed position towards the open position by fluid pressure.

In some examples, the second valve is moved from the closed position towards the open position by the fourth valve.

In some examples, the secondary fluid passageways of the first and second parts are coaxial with the primary fluid passageways of the first and second parts.

In some examples, the secondary fluid passageways of the first and second parts are surrounded by the primary fluid passageways of the first and second parts.

A quick disconnect coupling can include a first part defining a primary fluid passageway and a secondary fluid passageway, the first part including first and second valves movable between open and closed positions to control flow through the first part secondary fluid passageway, a primary valve movable between open and closed positions to control flow through the first part primary passageway, a second part defining a primary fluid passageway and a secondary fluid passageway, the second part including third and fourth valves movable between open and closed positions to control flow through the second part secondary fluid passageway, a primary valve movable between open and closed positions to control flow through the second part primary passageway, wherein the second part is removably connectable to the first part such that, when connected: the first and second part primary valves are open to place the primary passageways of the first and second parts in fluid communication with each other and the first through fourth valves are operable to place the secondary fluid passageways of the first and second parts in fluid communication with each other.

In some examples, one or both of the first through fourth valves allow fluid flow in a first direction and prevent fluid flow in a second direction.

In some examples, one or both of the first and third valves is a check valve.

In some examples, the first and third valves are check valves and the second and fourth valves are relief valves.

In some examples, the first through fourth valves are biased towards a closed position.

In some examples, the third valve is concentrically arranged within the first valve and wherein the fourth valve is concentrically arranged within the second valve.

In some examples, the second valve and the fourth valve abut each other when the first and second parts are connected to each other.

In some examples, fluid flow from the first part secondary fluid passageway to the second part secondary fluid passageway is prevented when either of the first and third valves is in the closed position.

In some examples, the second and fourth valves are moved from the closed position towards the open position by fluid pressure.

In some examples, the first and third valves are respectively moved from the closed position towards the open position by the second and fourth valves.

In some examples, the secondary fluid passageways of the first and second parts are coaxial with the primary fluid passageways of the first and second parts.

In some examples, the secondary fluid passageways of the first and second parts are surrounded by the primary fluid passageways of the first and second parts.

A first coupling part of a quick disconnect coupling arrangement can include a primary fluid passageway, a secondary fluid passageway in fluid communication with the primary fluid passageway, a primary valve for controlling flow through the primary fluid passageway, a check valve for controlling flow through the secondary fluid passageway, a relief valve for controlling flow through the secondary fluid passageway, wherein the primary valve, check valve, and relief valve are concentrically aligned along a common axis.

In some examples, the relief valve is at least partially housed within the check valve.

In some examples, the check valve allows fluid flow in a first direction and prevents fluid flow in a second direction.

In some examples, the relief and check valves are biased towards a closed position.

In some examples, the check valve can be moved from the closed position towards the open position by an opposing force exerted on a head portion of the relief valve. In some examples, the secondary fluid passageway is surrounded by the primary fluid passageway.

A quick disconnect coupling can include a first part and a second part. The first part can define a primary fluid passageway and a secondary fluid passageway, the first part including a first valve configured as a relief or check valve controlling flow through the secondary fluid passageway. The second part can define a primary fluid passageway and a secondary fluid passageway, the second part including a second valve configured as a relief or check valve controlling flow through the secondary fluid passageway. The second part is removably connectable to the first part such that, when connected, the first and second valves are operable to allow for fluid flow from the first part secondary fluid passageway into the second part secondary fluid passageway.

In some examples, the first valve is configured as a relief valve that is moved from the closed position towards the open position by fluid pressure.

In some examples, the second valve is configured as a check valve that is moved from the closed position towards the open position by the relief valve or by fluid pressure.

A quick disconnect coupling arrangement can include a primary fluid passageway, a secondary fluid passageway in fluid communication with the primary fluid passageway, a primary valve for controlling flow through the primary fluid passageway, a poppet valve for controlling flow through the secondary fluid passageway, and a relief valve for controlling flow through the secondary fluid passageway when first and second part are in the disconnected position only, wherein the primary valve, poppet valve, and relief valve are concentrically aligned along a common axis.

In some examples, the relief valve is at least partially housed within the poppet valve.

In some examples, the poppet valve allows fluid flow in both directions.

In some examples, the relief and poppet valves are biased towards a closed position.

In some examples, the poppet valves are moved from the closed position towards the open position by the opposing poppet valve when first coupling part is connected with second coupling part.

In some examples, the secondary fluid passageway is surrounded by the primary fluid passageway.

A quick disconnect coupling can include a first part defining a primary fluid passageway and a secondary fluid passageway, the first part including first and second valve structures movable between open and closed positions to control flow through the first part secondary fluid passageway and a second part defining a primary fluid passageway and a secondary fluid passageway, the second part including a third and fourth valve structures movable between open and closed positions to control flow through the second part secondary fluid passageway, wherein the second part is removably connectable to the first part such that, when connected the first and second part primary passageways are placed in fluid communication with each other, and the first and third valves are placed in an open position and the second and fourth valves are biased towards a closed position.

In some examples, one or both of the first and third valves allow fluid flow in both directions.

In some examples, the first and third valves are poppet valves.

In some examples, the second and fourth valves are relief valves and the first and third valves are poppet valves.

In some examples, the first and third valves are biased towards an open position when coupling first and second parts are connected.

In some examples, the third valve is concentrically arranged within the first valve and wherein the fourth valve is concentrically arranged within the second valve.

In some examples, the second valve and the third fourth valve abut each other when the first and second parts are connected to each other.

In some examples, fluid flow from the first part secondary fluid passageway to the second part secondary fluid passageway is opened when the first and second coupling parts are connected.

In some examples, the second and fourth valves are moved from the closed position towards the open position by fluid pressure when first and second coupling parts are in the disconnected position.

In some examples, the secondary fluid passageways of the first and second parts are coaxial with the primary fluid passageways of the first and second parts.

In some examples, the secondary fluid passageways of the first and second parts are surrounded by the primary fluid passageways of the first and second parts.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
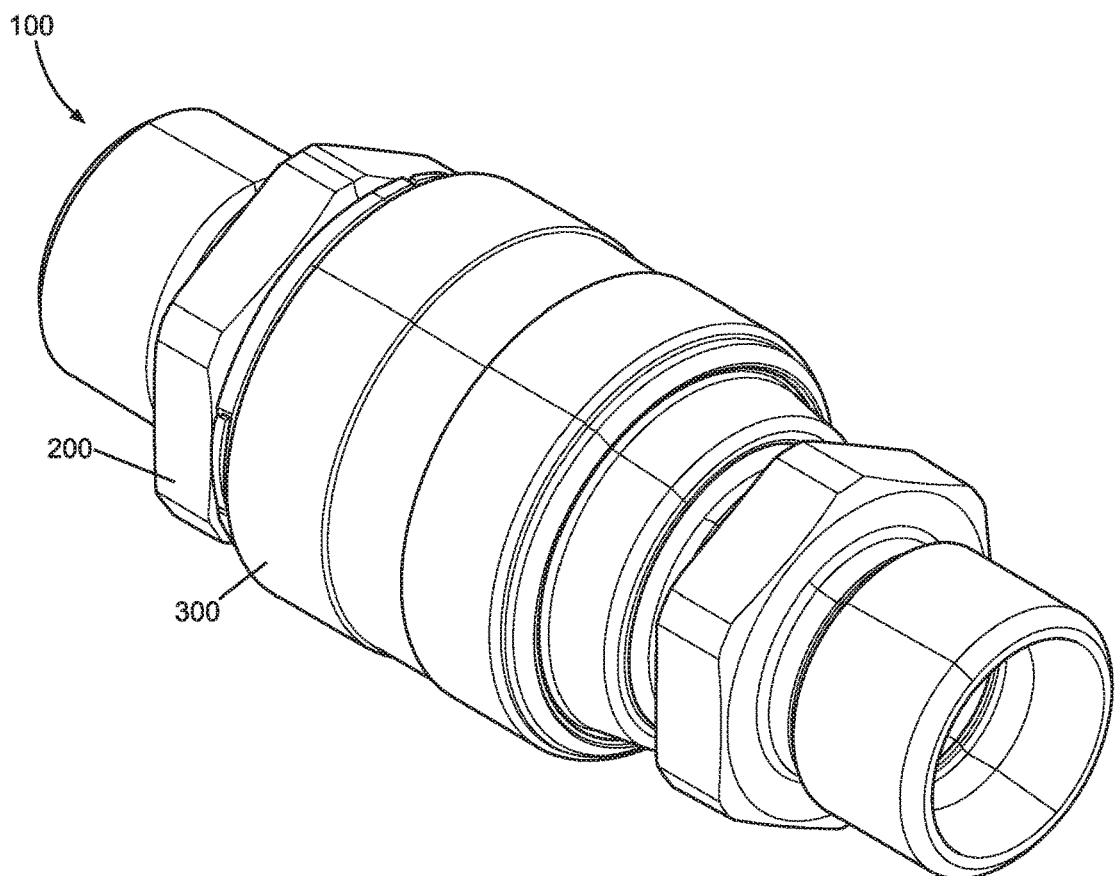
FIG. 1 is a first perspective view of a schematic representation of a quick disconnect coupling having features in accordance with the present disclosure.
Figure 2:
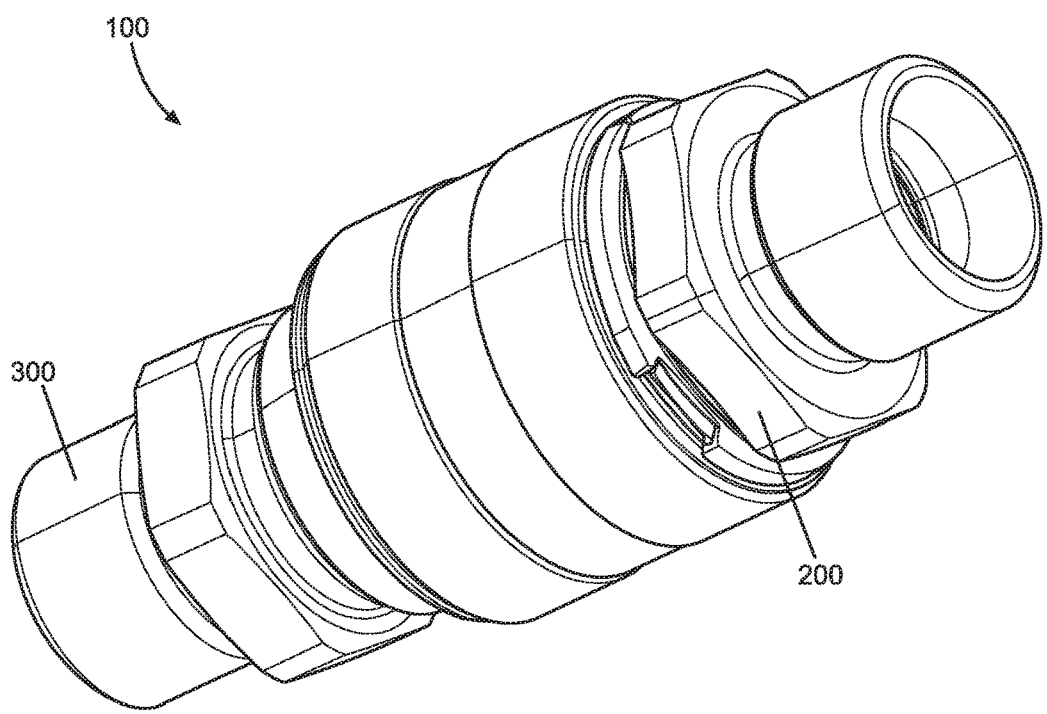
FIG. 2 is a second perspective view of the quick disconnect coupling shown in FIG. 1.
Figure 3:
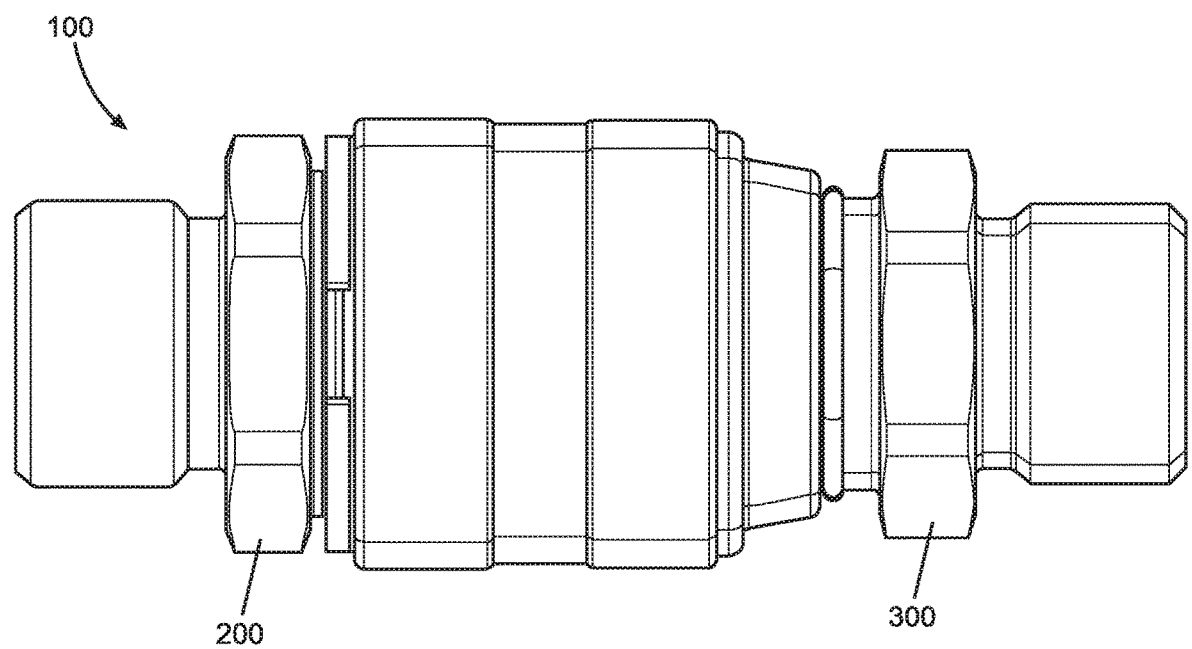
FIG. 3 is a side view of the quick disconnect coupling shown in FIG. 1.
Figure 4:
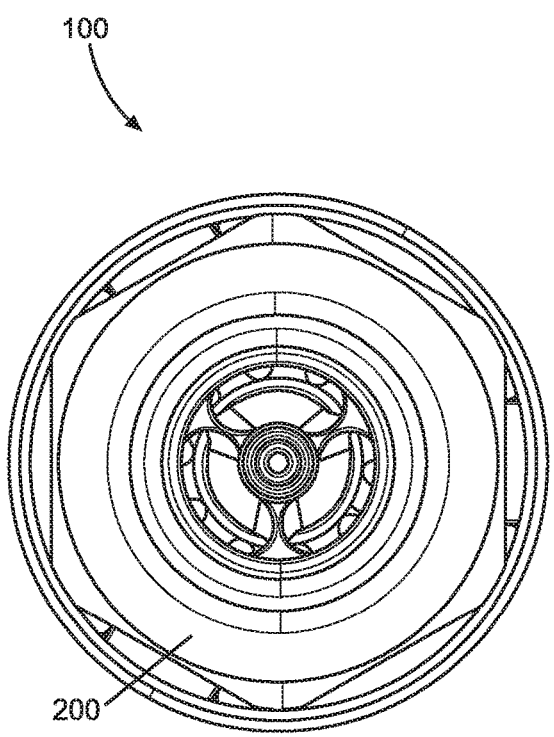
FIG. 4 is a first end view of the quick disconnect coupling shown in FIG. 1.
Figure 5:
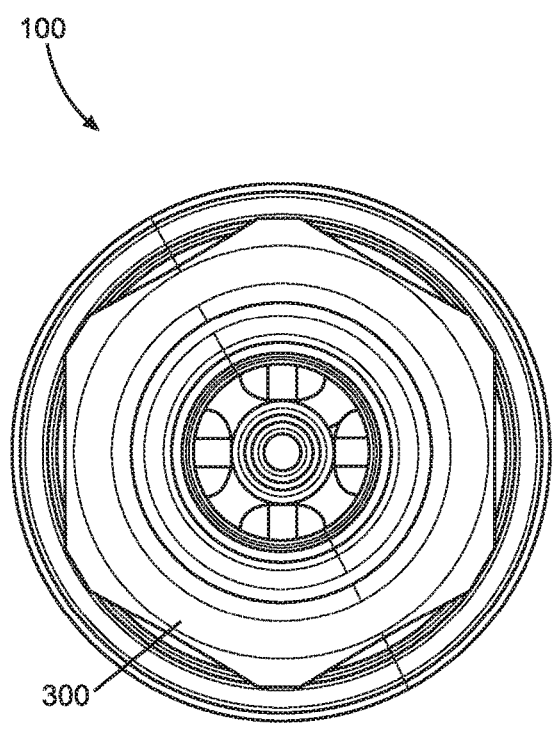
FIG. 5 is a second end view of the quick disconnect coupling shown in FIG. 1.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Referring to FIGS. 1 to 4 and 10 to 13, a quick disconnect coupling 100 is presented. The quick disconnect coupling 100 includes a first part 200 and a second part 300 that can be connected and disconnected from each other relatively quickly and without the use of tools. For the purpose of clarity, the first part 200 is shown in isolation at FIGS. 6 and 7 and the second part 300 is shown in isolation at FIGS. 8 and 9.

Figure 6:
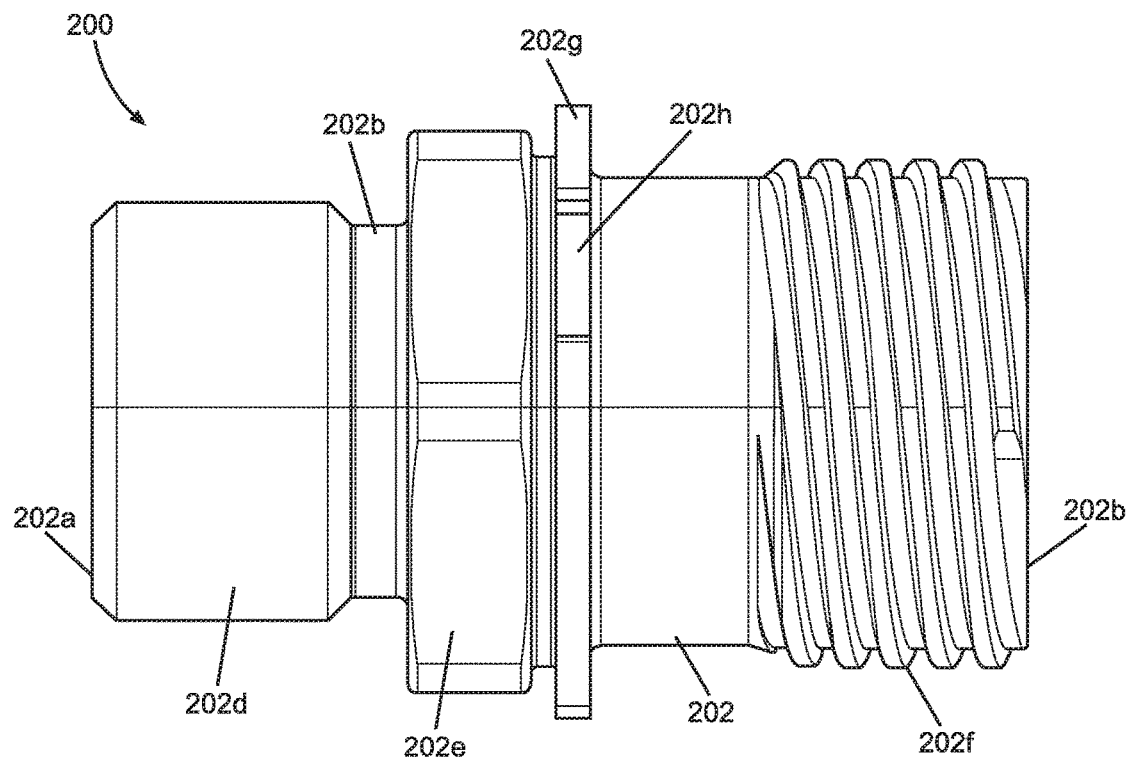
FIG. 6 is a side view of a first part of the quick disconnect coupling shown in FIG. 1.
Figure 7:
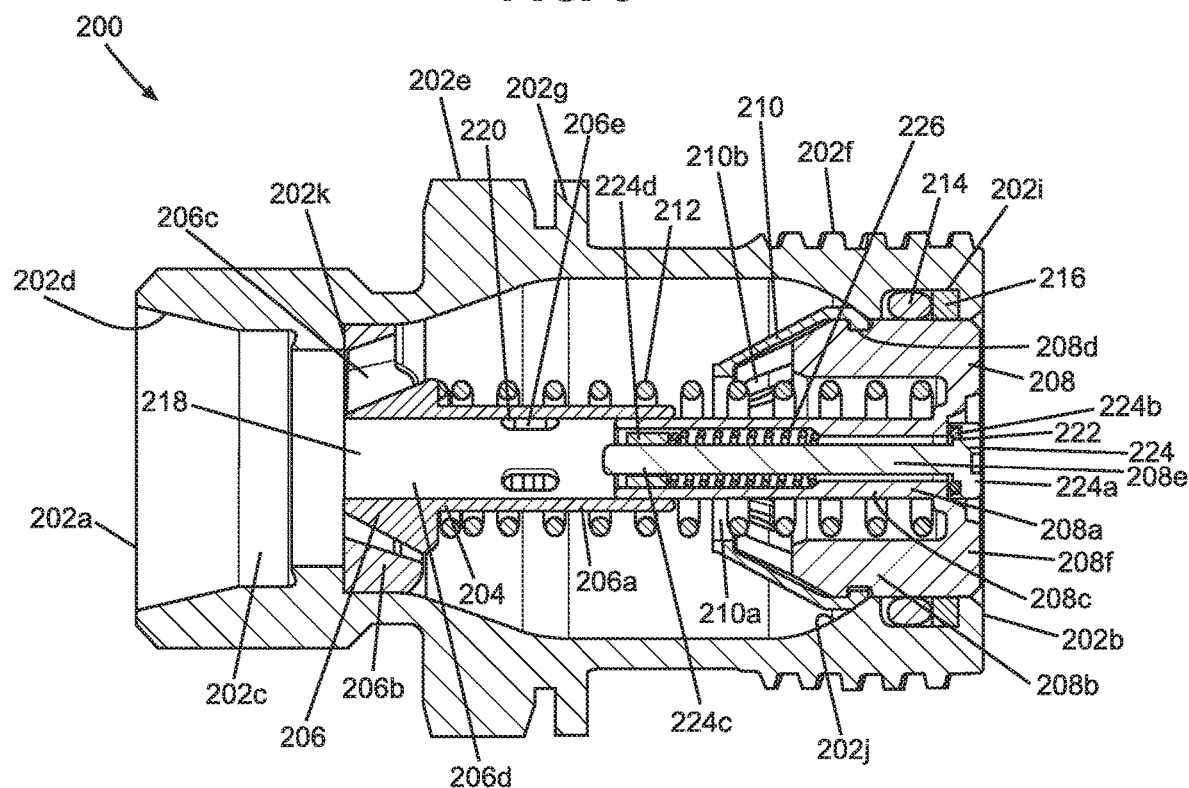
FIG. 7 is a cross-sectional side view of the quick disconnect coupling first part shown in FIG. 6, where it can be seen that a primary internal valve structure and a secondary internal valve structure are each in a closed position.

With reference to FIGS. 6 and 7, the first part 200 includes a main body 202 extending between a first end 202a and a second end 202b. The main body 202 further defines an internal fluid passageway 202c extending between the first and second ends 202a, 202b. The main body 202 is further shown as defining a fitting 202d proximate the first end 202a whereby a threaded or non-threaded pipe, tube, hose, or manifold port can be connected to the first part. The main body 202 is further shown as being provided with a first collar portion 202e which can serve as an interface for a tool, such as a wrench, for installing the main body 202 onto the pipe, tube, manifold port or hose and/or for holding the first part 200 stable while the second part 300 is being installed or removed from the first part 200. The main body 202 is also shown as including a threaded connection 202f proximate the second end 202b for receiving a threaded portion 306d of the second part 300 such that the first and second parts 200, 300 can be connected together. The main body 202 is further shown as including a second collar 202g having one or more notches 202h. A sleeve 322 of the second part 300 can abut the second collar 202g and tab portion(s) 322b of the sleeve can be received into the one or more notches 202h such that the second part 300 cannot be unthreaded from the first part 200 until the sleeve has been retracted sufficiently to disengage the tab portion(s) 322b from the one or more notches 202h. The main body 200 is also shown as including a seal channel or recess 202i, a stop surface 202j, and a shoulder 202k, each of which is discussed in further detail below.

With continued reference to FIGS. 6 and 7, the first part 200 is further shown as including a valve structure 204 including a first valve part 206 and a second valve part 208. In one aspect, the valve structure 204 can be characterized as a primary internal valve structure 204. The first valve part 206 is shown as having a main body 206a with a base portion 202b having apertures 202c, wherein the base portion 206b is supported by the shoulder 202k. The main body 206a is further shown as including a stem portion 206d having apertures 206e. The stem portion 206d is configured as a hollow cylindrical member extending from the base portion 206b. The second valve part 208 is shown as having a main body 208a with a base portion 208b and a stem portion 208c extending from the base portion 208b. The stem portion 208c is configured as a hollow cylindrical member extending from the base portion 208b and is sized to be slidably received into the stem portion 206d of the first valve part 206. A collar 210 is also shown as being connected to the base portion 208b and includes a central aperture 210a receiving the stem portions 206d, 208b and a plurality of radial apertures 210b. In the example shown, the collar 210 is snap-fit into a recess 208d of the main body 208. The valve structure 204 is also shown as including a biasing spring 212 extending between the first and second valve parts 206, 208. The biasing spring 212 forces the second valve part 208 towards the second end 202b into a closed position, which is the position shown at FIG. 7.

In the closed position of the valve structure 204, seal member 214, located in recess 202i, forms a seal against the second valve part 208 such that fluid flow through the internal passageway 202c is blocked by the second valve part 208. A backup ring 216 is also provided in the recess 202i to support the seal member 214. The second valve part 208 is stopped by the interaction between the collar 210 and the stop surface 202j of the main body 202. It is noted that the initial movement of the second valve part 208 from the position shown at FIG. 7 towards the second end 202a does not unblock the fluid passageway 202c, and that the second valve part 208 must be displaced towards first end 202a such that a front face portion 208f is moved proximate the stop surface 202j.

In one aspect, the stem portions 206d and 208c define a secondary fluid passageway 218 and further define a valve structure 220. When the valve structure 220 is in the closed position, the stem portion 208c is moved relative the stem portion 206d such that the apertures 206e are open to the internal fluid passageway 202c, thereby providing an alternative or secondary pathway for placing the secondary fluid passageway 218 in fluid communication with the internal fluid passageway 202c. When the valve structure 204 is moved into an open position, such as shown in FIGS. 10 to 13, the stem portion 208c slides further into the stem portion 206d and blocks the apertures 206e. Regardless of the position of the stem portion 208c, a fluid pathway between the passageways 202c, 218 exists proximate the first end 202a whereby fluid can flow into either passageway. Accordingly, in some embodiments, the apertures 206e can be eliminated without departing from the concepts presented herein.

In one aspect, the first valve part 200 further includes a valve structure 222 defined in part by the stem portion 208c and by a valve member 224. In one aspect, the valve structure 222 can be characterized as a secondary internal valve structure 224. The valve member 224 is shown as including a head portion 224a with a seal member 224b and a stem portion 224c to which a flange portion 224d is either attached or formed with the stem portion 224c. In the example shown, the flange portion 224d is a nut threaded onto the stem portion 224c. The valve structure 222 is also shown as including a biasing spring 226 extending between the flange portion 224d and a shoulder 208e formed in the stem portion 208c. The biasing spring 226 forces the valve member 224 towards the first end 202a such that the seal member 224b forms a seal with the second valve part 208. When sufficient fluid pressure exists, the valve member 224 is moved towards the second end 202b such that fluid can flow though the secondary fluid passageway 218 from the first end 202a to the second end 202b through the stem portions 206d, 208c, even when the second valve part 208 is in the closed position and blocking flow through the internal passageway 202c.

The valve structure 222 provides useful functions under at least two separate conditions. In a first condition, when the first part 200 is disconnected from the second part 300 and the valve structure 204 is therefore in a closed position, the valve structure 222 can function as a relief valve. For example, in some applications, an LRU is provided with two first parts 200 connectable to two second parts 300. When the first parts 200 associated with the LRU are disconnected, fluid will remain in the LRU and in the lines leading up to and including the two first parts 200. With such a filled system, thermal expansion of the fluid can occur and must be relieved in order to avoid excessive pressures. With building fluid pressure acting on the valve structures 222 of the first parts 200, the valve structures 222 will open to relieve pressure in the system. In one example, the valve structures 222 are configured to open at a cracking pressure of about 120 to 160 psi. Other configurations are possible. For example, a single first part 200 could provide pressure relief for a hydraulic system or branch.

In a second condition, the valve structure 222 allows for the valve structure 204 to move from the closed position to the open position under a hydraulic lock condition. A hydraulic lock condition is a condition in which the fluid in the line connected to the first part 200 and the fluid within the first part 200 itself cannot be displaced further into the line or otherwise out of the first part 200. As is explained in more detail later, the valve structure 204 is moved into the open position by the second part 300 during the connection process to the first part 200. In order to move the valve structure 204 to the open condition, fluid within the first part 200 must be displaced until, as related previously, the second valve part 208 is displaced towards first end 202a such that the front face portion 208f is moved proximate the stop surface 202j to open the internal passageway 202c to the second end 202b. As this displacement occurs under a hydraulic lock condition, the pressure within the first part builds 200 until sufficient pressure exists to open the valve structure 222. Once the valve structure 222 opens, the fluid displaced by the movement of the second valve part 208 is relieved through the valve structure 222 such that the connection process can continue whereby the valve structure 204 is moved to the open condition.

Figure 8:
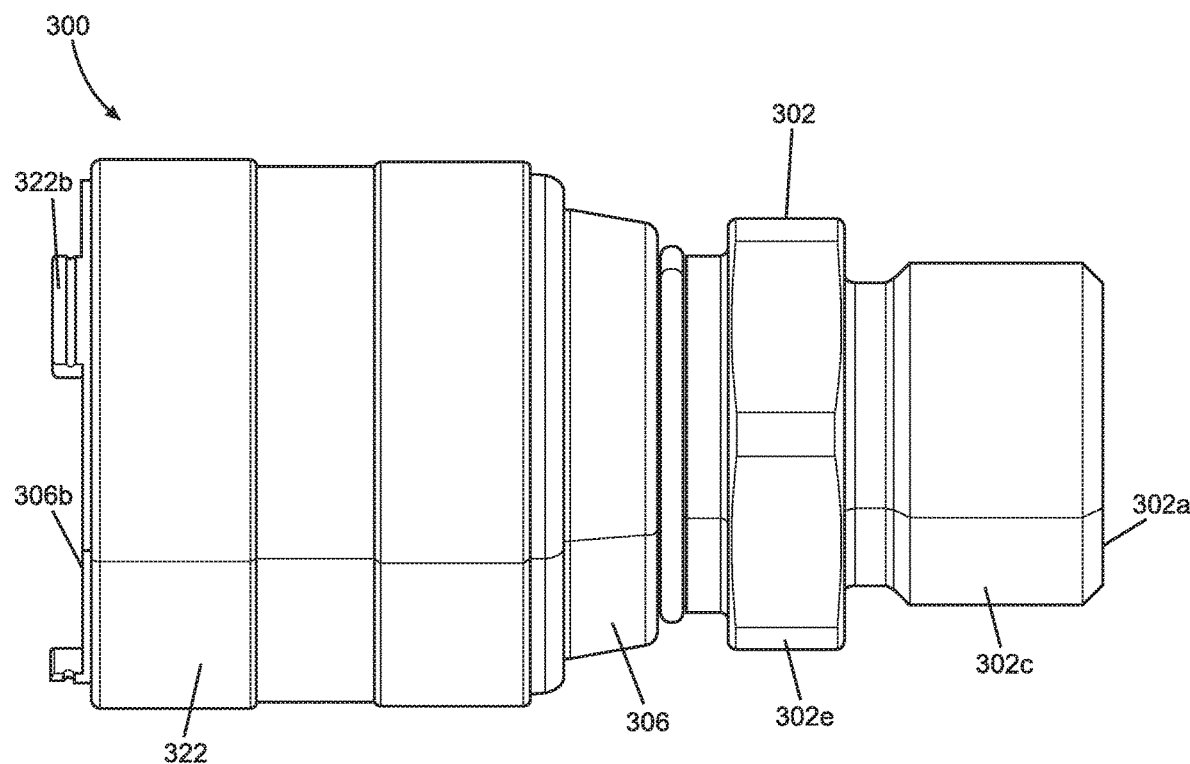
FIG. 8 is a side view of a second part of the quick disconnect coupling shown in FIG. 1.
Figure 9:
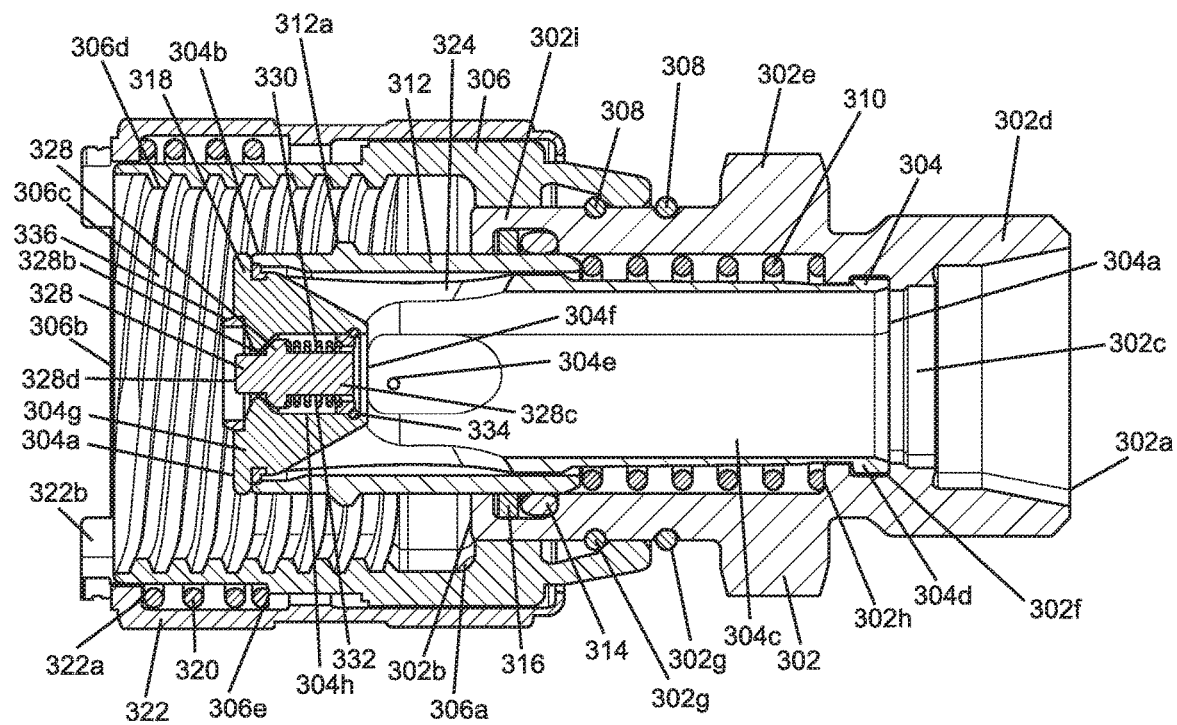
FIG. 9 is a cross-sectional side view of the quick disconnect coupling second part shown in FIG. 8, where it can be seen that a primary internal valve structure and a secondary internal valve structure are each in a closed position.
Figure 10:
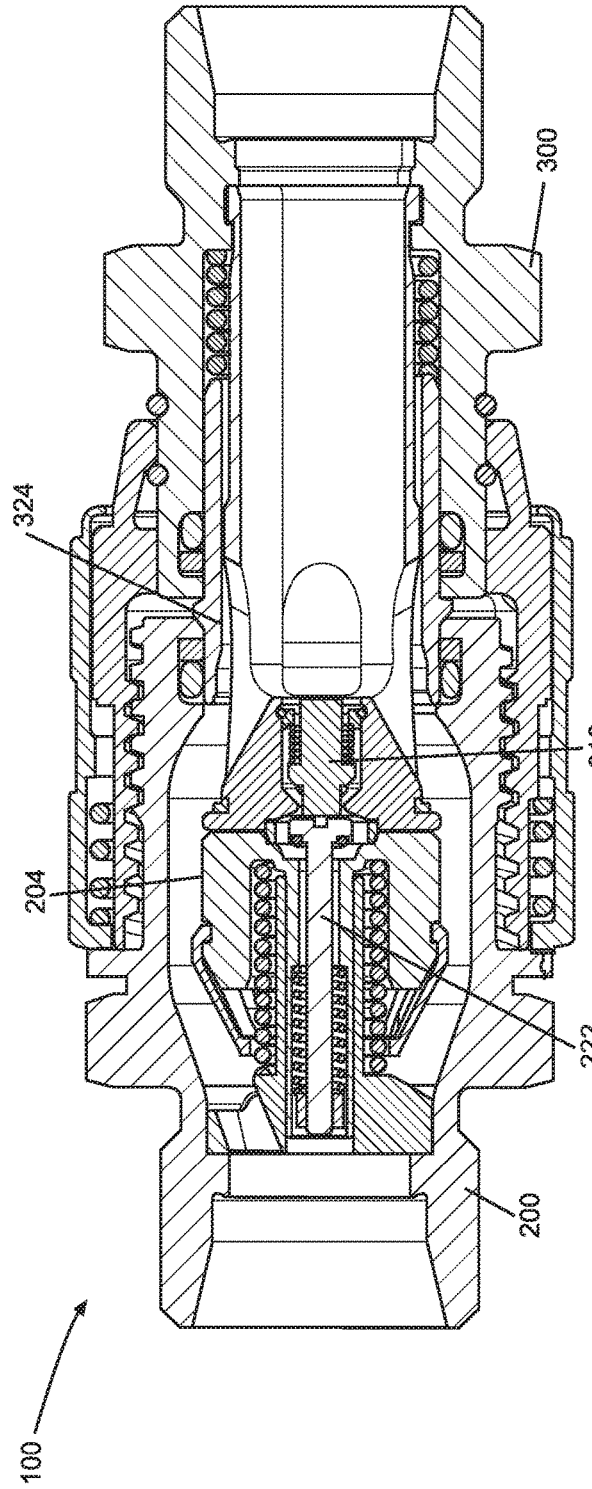
FIG. 10 is a cross-sectional view of the quick disconnect coupling shown in FIG. 1, where it can be seen that the primary and secondary internal valve structures of each coupling part are each in an open position.
Figure 11:
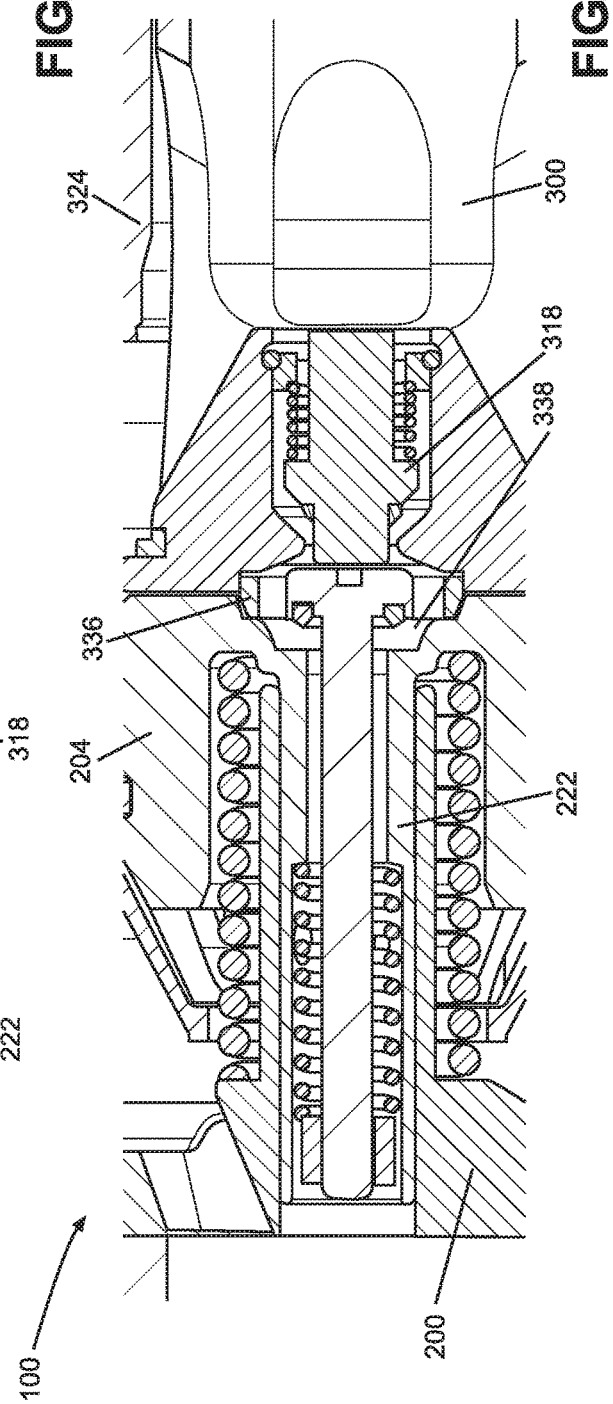
FIG. 11 is a close up view of a portion of the coupling shown in FIG. 10.

Referring to FIGS. 8 and 9, the second part 300 is shown in greater detail. As shown, the second part 300 includes a first body 302, a second body 304 connected to the first body 302, and a third body 306 received into and connected to the first body 302. In one aspect, the first body 302 extends between a first end 302a and a second end 302b and defines an internal passageway 302c extending between the ends 302a, 302b. The first body 302 is further shown as defining a fitting 302d proximate the first end 302a whereby a threaded or non-threaded pipe, tube, manifold port, or hose can be connected to the first part. The main body 302 is further shown as being provided with a first collar portion 302e which can serve as an interface for a tool, such as a wrench, for installing the main body 302 onto the pipe, tube, manifold port, or hose and/or for holding the second part 300 stable while the second part 300 is being installed or removed from the first part 200. The first body 302 is also shown as including a recess 302f for forming a connection with the second body 304, recesses 302g for holding rings 308 that secure the third body 306 to the first body 302 while still allowing for the third body 306 to rotate with respect to the first body 302. The first body 302 also defines a shoulder 302h for supporting a spring 310 acting against a sleeve 312 surrounding the second body 304. The first body 302 is further shown as including a recess 302i for retaining a seal 314 and backup ring 316 such that a seal is formed between the second body 304 and the sleeve 312.

The second body 304 is shown as extending between a first end 304a and a second end 304b and defining an internal passageway 304c extending therebetween. The second body 304 is shown as having a flange portion 304d which is received into the first part recess 302f to connect the first and second bodies 302, 304 together. The second body 304 is further shown as including one or more apertures 304e for allowing fluid to pass between the internal passageway 304c and the exterior of the second body 304. When the sleeve 312 is in a closed or extended position, as biased by the spring 310 and as shown at FIG. 9, the sleeve 312 covers the apertures 304e such that fluid is blocked from flowing through the apertures 304e such that fluid is prevented from flowing between the internal passageways 302c, 304c and an internal passageway 306c defined by the third body 306. Accordingly, the sleeve 312 and apertures 304e can be characterized as forming a valve structure 324. In one aspect, the valve structure 324 can be characterized as a primary internal valve structure 324. The second body 304 is also shown as being provided with an open end 304f at the second end 304b. A valve structure 318, discussed in more detail later, is mounted to the second body 304 such that the open end 304f is in fluid communication with the valve structure 318.

The third body 306 is shown as extending between a first end 306a and a second end 306b and defines an internal structure 306c extending therebetween. In one aspect, the third body 306 includes a threaded portion 306d proximate the second end 306b for receiving the threaded portion 202f of the first part 200 such that the first and second parts 200, 300 can be connected together. The third body 306 is further shown as including a shoulder 306e against which a spring 320 acts. A sleeve 322 surrounds the third body 306 and includes a shoulder 306e against which an opposite end of the spring 320 acts to bias the sleeve towards the second end 306b such that the tab portions 322b are held into the notches 202h of the first part 200 such that the threaded connection between the threaded portions 306d, 202f cannot be disengaged without first retracting the sleeve 322 against the force of the spring 320, as previously described above.

In one aspect, the valve structure 318 is defined in part by the second body 304 and a valve member 328. The valve structure 318 can be characterized as a secondary internal valve structure 318. Defining the first end 304a, the second body 304 defines a valve housing portion 304g defining an internal passageway 304h within which the valve member 328 is disposed. The valve member 328 is shown as including a head portion 328a with a seal member 328b and a stem portion 328c. The valve structure 318 is also shown as including a biasing spring 330 extending between the head portion 328a and a flange or ring structure 332, shown as being retained in place in the internal passageway 304h by a clip 334. Accordingly, the biasing spring 330 biases the head portion 328a towards the first end 304a such that a seal is formed between the seal member 328b and the second body 304. Accordingly, the valve structure 318 functions as a check valve to prevent fluid from passing through the internal passageway 304h, and thus also through the interconnected passageway 304c, when the second part 300 is disconnected from the first part 200.

In the closed position of the valve structure 318, as shown at FIG. 9, a nose portion 328d of the valve member 328 extends beyond the head portion 328a and seal member 328b, and can act as a point of contact with the head portion 224a of the valve part 224. In one example, a small axial gap exists between the head portion 224a and the head portion 224a of the valve part 224 when the internal valve structures are in the closed positions. Accordingly, when the valve part 224 is moved into the open position to relieve fluid pressure in the first part 200, as previously described, the head portion 224a can physically move the valve member 328 into the open position such that the relieved fluid from the first part 200 can be passed into the second part 300 internal passageway 304c/302c. A seal member 336 is also shown as being provided at the first end 304a of the second body 304 such that a seal can be formed between the second body 304 and the second valve part 208 of the first part 200 when the first and second parts 200, 300 are connected together.

Figure 12:
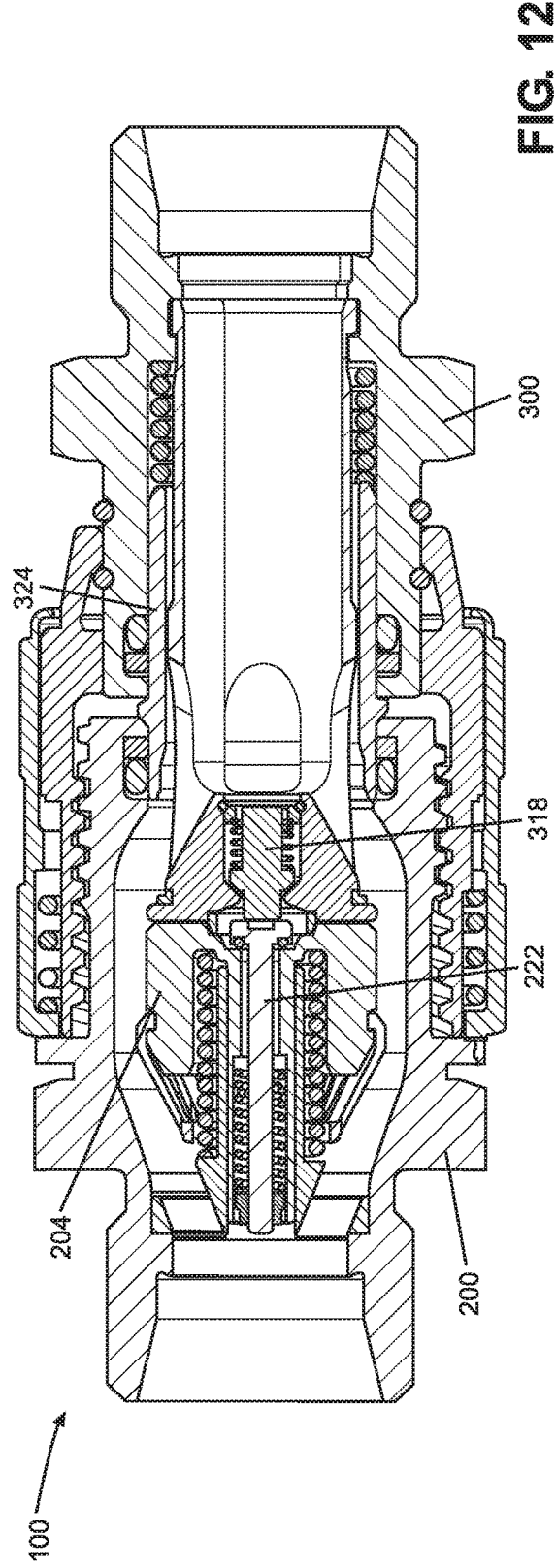
FIG. 12 is a cross-sectional view of the quick disconnect coupling shown in FIG. 1, where it can be seen that the primary internal valve structures of each coupling part are in an open position and the secondary internal valve structures of each coupling part are each in a closed position.
Figure 13:
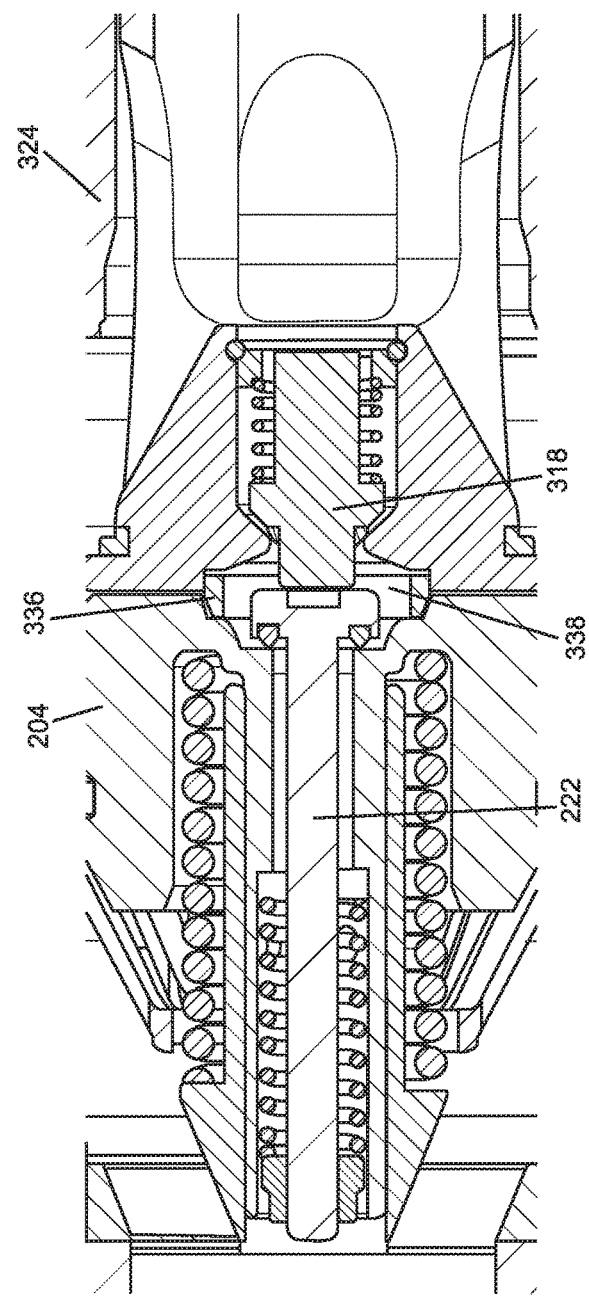
FIG. 13 is a close up view of a portion of the coupling shown in FIG. 12.

Referring to FIGS. 12 and 13, it can be seen that the first part 200 is connected to the second part 300, and that the valve structures 222 and 318 are in the closed position.

When the first and second parts 200, 300 are fully connected together, the sleeve 312 is moved from the closed position into the open position via contact between a surface 312a of the sleeve 312 and the second end 202b of the first part main body 202. Additionally, the valve structure 204 is also placed in the fully open position as the valve structure 318 of the second part 300 contacts and pushes the valve part 208 of the first part 200 against the force of the spring 212. As a result, upon connecting the first and second parts 200, 300, the internal fluid passageways 302c, 304c, and 202c are placed in fluid communication with each other to define a primary fluid passageway through the first and second parts 200, 300. Additionally, as most easily seen at FIGS. 11 and 13, when the first and second parts 200, 300 are connected together, the internal passageways 304h/304c and 218 are also placed in fluid communication with each other to define a secondary fluid passageway that is opened and closed by operation of the valve structures 318, 204. The passageways 304c and 218 also form an internal cavity 338 into which the nose portion 328d and head portion 224a can extend. In one configuration, the nose portion 328d does not physically contact the head portion 224a to open the valve structure 318, and instead pressure from fluid entering the cavity 338 via the valve structure 204 causes the valve structure 318 to open.

In addition to the above-described configuration, additional configurations are possible. In some examples, the second part 300 can be additionally provided with the valve structure 222 such that a relief valve function could be obtained in the second part 300 as well. In some examples, the first part 200 can be additionally provided with the valve structure 318 such that a bleed valve function could be obtained in the first part 200 as well. In some examples, the first and second part 200, 300 have similarly configured valve structures, each with a relief and bleed valve such that relief and bleed functions are realized in each of the first and second parts 200, 300. An example of such an arrangement is illustrated at FIGS. 14 and 15.

Figure 14:
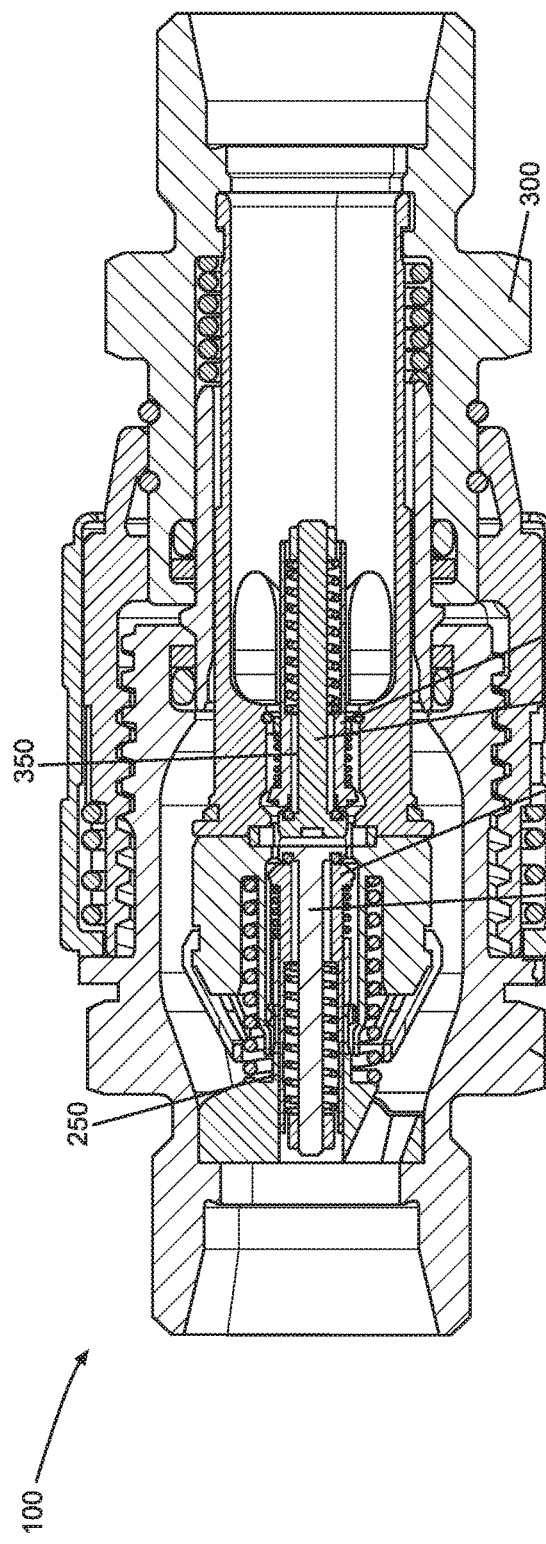
FIG. 14 is a partial cross-sectional view of an alternative arrangement of the quick disconnect coupling shown in FIG. 1.
Figure 15:
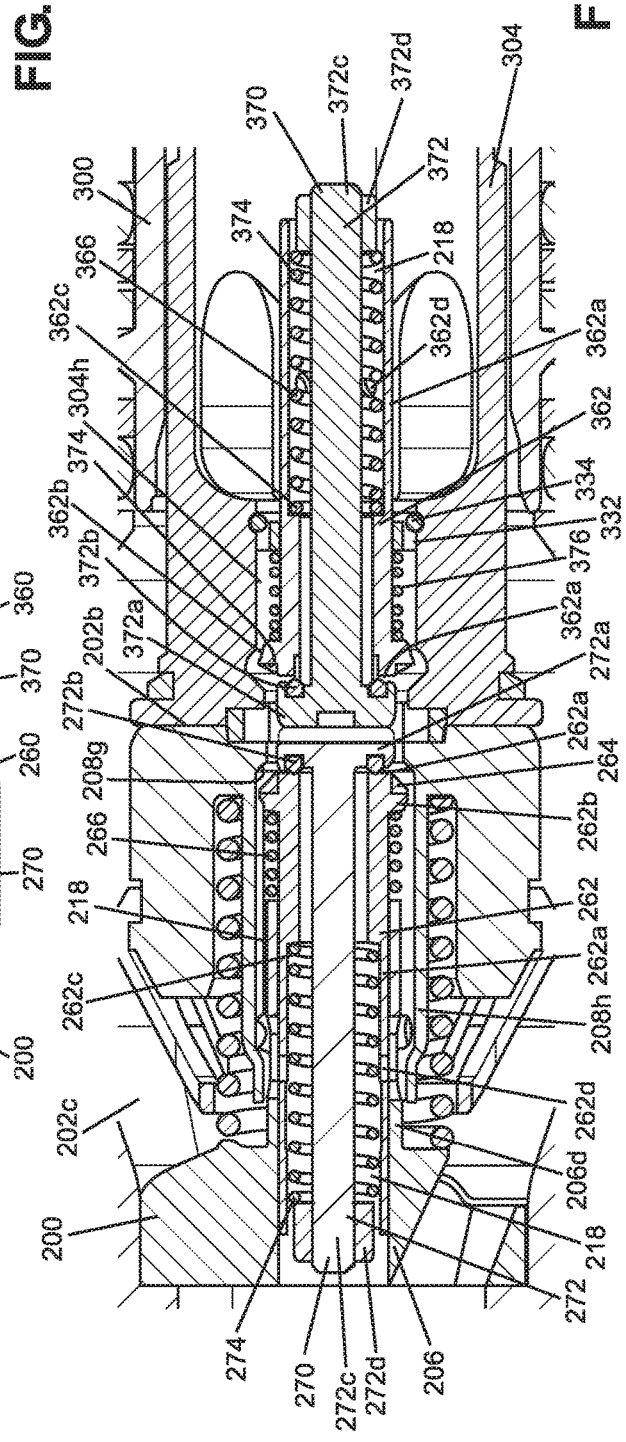
FIG. 15 is a close up view of a portion of the coupling shown in FIG. 14.

As shown at FIGS. 14 and 15, the first and second parts 200, 300 are respectively provided with a valve structure 204, 304 and a valve structure 250, 350. Each of the valve structures 250, 350 combines the features of the valve structures 222 and 318 such that bleed and relief functions are provided by each of the valve structures 250, 350. The valve structures 250, 350 are generally configured in a similar fashion, but slight differences exist due to the physical differences between the housing bodies of the first and second parts 200, 300 as is discussed later. As shown, the valve structures 250, 350 of the first and second parts 200, 300 oppose each other along a common axis and extend into the cavity 338. Accordingly, each of the valve structures 250, 350 can bleed into the cavity 338 when the first parts 200, 300 are connected to each other. Similarly, when the first and second parts 200, 300 are disconnected, the valve structures 250, 350 can provide a relieve valve function to bleed fluid when thermal expansion of fluid causes a buildup of sufficient pressure.

As shown, the valve structure 250 includes a pair of concentrically arranged valve structures 260, 270. Accordingly, the valve structure 260 can be characterized as being an outer valve structure 260 and the valve structure 270 can be characterized as being an inner valve structure 270.

In one aspect, the outer valve structure 260 is formed by the stem portion 206d of the first valve part 206 and a sleeve part 262 defining an end face 262a, an outer flange or shoulder portion 262b and an inner shoulder portion 262c. A seal 264 circumscribes the sleeve part 262 and is supported by the outer flange or shoulder portion 262b. A spring 266 is also provided and extends between the outer flange or shoulder portion 262b and an end of the stem portion 206d. The spring 266 biases the sleeve part 262 towards the second end 202b of the valve part 200 such that a seal forms between the seal part 264 and an inner surface 208g of the second valve part 208. In this position, the outer valve structure 260 is in a closed position such that flow is prevented through the secondary fluid passageway 218, which in this configuration, is a flow passageway that extends between the stem portion 206d and an apertured outer sleeve portion 208h of the second valve part 208.

In one aspect, the inner valve structure 270 is configured similar to previously described valve structure 222, however, the inner valve structure 270 is partially defined by the sleeve part 262 of the outer valve structure 270 instead of the stem portion 208c. As shown, the inner valve structure 270 is shown as additionally including a valve member 272. The valve member 272 is shown as including a head portion 272a with a seal member 272b and a stem portion 272c to which a flange portion 272d is either attached or formed with the stem portion 272c. In the example shown, the flange portion 272d is a nut threaded onto the stem portion 272c. The valve structure 250 is also shown as including a biasing spring 274 extending between the flange portion 272d and the inner shoulder 262c formed in the sleeve 262. The biasing spring 274 forces the valve member 272 towards the first end 202a such that the seal member 272b forms a seal with the end face 262a of the sleeve 262. When sufficient fluid pressure exists, the valve member 272 is moved towards the second end 202b such that fluid can flow though the sleeve 262 from the first end 202a to the second end 202b. The interior passageway of the sleeve 262 can be characterized as being a portion of the secondary fluid passageway 218. The secondary fluid passageway 218 is also defined by apertures 262d in the sleeve 262 and the interstitial space between the sleeve 262 and the outer sleeve portion 208h leading to the second end 262a.

The valve structure 350 is generally similar to the valve structure 250 and includes a pair of concentrically arranged valve structures 360, 370. Accordingly, the valve structure 360 can be characterized as being an outer valve structure 360 similar to outer valve structure 260 and the valve structure 370 can be characterized as being an inner valve structure 370 similar to inner valve structure 270. Accordingly, the valve structure 360 includes a sleeve part 362 defining an end face 362a, an outer flange or shoulder portion 362b and an inner shoulder portion 362c, a seal 364, and a spring 366. Likewise, the valve structure 370 includes a valve member 372 having a head portion 372a, a seal member 372b, a stem portion 372c, a flange portion 372d, and a biasing spring 374. As many components are similar between the valve structures 250 and 350, the descriptions need not be repeated again here for the valve structures 350.

A primary difference between valve structures 250 and 350 is that the valve structure 350 is provided in and supported by the stationary body 304 rather than being disposed within a moving valve structure, as is valve structure 250. As a result, the biasing spring 366 for the valve structure 350 is supported by the flange or ring structure 332, shown as being retained in place in the internal passageway 304h by a clip 334. This is the same general configuration as previously described for the valve structure 318.

With the configuration shown at FIGS. 14 and 15, the head portions 272b, 372b of the valve parts 272, 372 are arranged such that they contact each other when the valve parts 200, 300 are connected together. By virtue of this contact, the outer valve structures 260, 360 are opened such that the secondary fluid passageways of the first and second coupling parts 200, 300 are placed in fluid communication with each other. When coupling the parts 200, 300 together, if one of the coupling parts 200, 300 is under a hydraulic lock condition, the associated inner valve structure 270, 370 can open to relieve fluid pressure into the other coupling secondary passageway. This action will also cause the opposing outer valve structure 260 or 360 to open further. Accordingly, during the coupling process, the outer valve structure 260 acts as a bleed valve for the inner valve structure 370 when the inner valve structure operates as a relief valve while the outer valve structure 360 acts as a bleed valve for the inner valve structure 270 when the inner valve structure operates as a relief valve. When the coupling parts 200, 300 are disconnected from each other, the inner valve structures 270, 370 can act as relief valves while the outer valve structures 260, 360 act as opposing poppet or check valves. It is also noted that relief valves 270, 370 will only communicate fluid when the coupling parts 200, 300 are in disconnected position. During connection of the coupling parts 200, 300, the primary valves (e.g. valve structures 204, 324) do not begin to open until after the relief valve heads 272a, 372a contact whereby the outer valve structures 260, 360 are forced open allowing flow through the secondary flow passage. After the coupling parts 200, 300 are fully connected, the relief valves 270, 370 should remain closed and the outer valves 260, 360 should remain open, as shown in FIGS. 14 and 15.

The depicted coupling parts 200, 300 are shown as exemplary combinations of the disclosed internal valve structures. However, other combinations are possible. For example, a quick disconnect coupling 100 could be provided with a first coupling part having a valve structure similar to the valve structure 222 depicted in FIGS. 7 and 10-13, and provided with a second coupling part having a valve structure similar to the valve structure 350 with valve structures 360 and 370. In such an example, the valve structure 360 is biased toward the closed, sealed position when the coupling parts are connected together. With such a configuration, a relief valve function is provided in one coupling part, and a combination relief and poppet or check valve function is provided by the other coupling part. In another example, the valve structures 250, 350 are configured such that the head portions 272a, 372a do not initially contact when the coupling parts are connected together, thereby creating a small axial gap between the head portions 272a, 372a in the same manner a small axial gap is created between the head portion 224a and the nose portion 328d in the example shown at FIGS. 12 and 13. In such an example, the valve structures 260, 360 are biased towards the closed, sealed position when the coupling parts are connected together. Although the coupling parts 200 are shown as male coupling parts and the coupling parts 300 are shown as female coupling parts, the reverse arrangement is also possible.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. A quick disconnect coupling comprising:
 a) a first part defining a primary fluid passageway and a secondary fluid passageway, the first part including:
  (i) a first primary valve movable between open and closed positions to control flow through the first part primary fluid passageway;
  (ii) a first secondary valve movable between open and closed positions to control flow through the first part secondary fluid passageway;
 b) a second part defining a primary fluid passageway and a secondary fluid passageway, the second part including:
  (i) a second primary valve movable between open and closed positions to control flow through the second part primary fluid passageway;
  (ii) a second secondary valve movable between open and closed positions to control flow through the second part secondary fluid passageway;
 c) wherein the second part is removably connectable to the first part such that, when connected:
  (i) the first and second part primary valves contact each other and are open to place the primary fluid passageways of the first and second parts in fluid communication with each other; and
  (ii) the first and second secondary valves are operable to place the secondary fluid passageways of the first and second parts in fluid communication with each other.

2. The quick disconnect coupling of claim 1, wherein one or both of the first and second secondary valves allow fluid flow in a first direction and prevent fluid flow in a second direction.

3. The quick disconnect coupling of claim 2, wherein one or both of the first and second secondary valves is a check valve.

4. The quick disconnect coupling of claim 2, wherein the first secondary valve is a relief valve and the second secondary valve is a check valve.

5. The quick disconnect coupling of claim 1, wherein the first and second secondary valves are biased towards the closed position.

6. The quick disconnect coupling of claim 1, wherein the first primary valve and the second secondary valve abut each other when the first and second parts are connected to each other.

7. The quick disconnect coupling of claim 1, wherein fluid flow from the first part secondary fluid passageway to the second part secondary fluid passageway is prevented when either of the first and second secondary valves is in the closed position.

8. The quick disconnect coupling of claim 1, wherein the first secondary valve is moved from the closed position towards the open position by fluid pressure.

9. The quick disconnect coupling of claim 1, wherein the second secondary valve is moved from the closed position towards the open position by the first primary valve or by fluid pressure.

10. The quick disconnect coupling of claim 1, wherein the secondary fluid passageways of the first and second parts are coaxial with the primary fluid passageways of the first and second parts.

11. The quick disconnect coupling of claim 1, wherein the secondary fluid passageways of the first and second parts are surrounded by the primary fluid passageways of the first and second parts.

12. A quick disconnect coupling comprising:
a) a first part defining a primary fluid passageway and a secondary fluid passageway, the first part including a first valve configured as a relief or check valve controlling flow through the secondary fluid passageway; and
b) a second part defining a primary fluid passageway and a secondary fluid passageway, the second part including a second valve configured as a relief or check valve controlling flow through the secondary fluid passageway, the second part being removably connectable to the first part such that, when connected, the first and second valves are operable to contact each other to allow for fluid flow from the first part secondary fluid passageway into the second part secondary fluid passageway.

13. The quick disconnect coupling of claim 12, wherein the first and second valves allow fluid flow in a first direction and prevent fluid flow in a second direction.

14. The quick disconnect coupling of claim 12, wherein the first and second valves are biased towards a closed position.

15. The quick disconnect coupling of claim 12, wherein the first and second valves abut each other when the first and second parts are connected to each other.

16. The quick disconnect coupling of claim 14, wherein fluid flow from the first part secondary fluid passageway to the second part secondary fluid passageway is prevented when either of the first and second valves is in the closed position.

17. The quick disconnect coupling of claim 12, wherein the first valve is configured as a relief valve that is moved from a closed position towards an open position by the second valve or by fluid pressure.

18. The quick disconnect coupling of claim 17, wherein the second valve is configured as a check valve that is moved from the closed position towards the open position by the relief valve or by fluid pressure.

19. The quick disconnect coupling of claim 12, wherein the secondary fluid passageways of the first and second parts are coaxial with the primary fluid passageways of the first and second parts.

20. The quick disconnect coupling of claim 19, wherein the secondary fluid passageways of the first and second parts are surrounded by the primary fluid passageways of the first and second parts.

* * * * *